(12) United States Patent
Craggs (10) Patent No.: US 9,160,699 B2
(45) Date of Patent: Oct. 13, 2015

(54) CLIENT RESPONSIBILITIES IN MESSAGING SYSTEMS

(75) Inventor: Ian Gerald Craggs, Salisbury (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1282 days.

(21) Appl. No.: 11/421,835

(22) Filed: Jun. 2, 2006

(65) Prior Publication Data

US 2006/0277280 A1 Dec. 7, 2006

(30) Foreign Application Priority Data

Jun. 4, 2005 (GB) .................................. 0511392.3

(51) Int. Cl.
*G06F 3/00* (2006.01)
*G06F 9/44* (2006.01)
*G06F 9/46* (2006.01)
*G06F 13/00* (2006.01)
*H04L 12/58* (2006.01)

(52) U.S. Cl.
CPC ...................................... *H04L 51/26* (2013.01)

(58) Field of Classification Search
CPC ...................................................... H04L 51/26
USPC .......................................... 719/316; 709/206
See application file for complete search history.

(56) References Cited

U.S. PATENT DOCUMENTS

| | | | | |
|---|---|---|---|---|
| 5,742,606 A | * | 4/1998 | Iliadis et al. ................... | 370/413 |
| 6,154,781 A | * | 11/2000 | Bolam et al. ................... | 709/238 |
| 6,353,616 B1 | * | 3/2002 | Elwalid et al. ................. | 370/443 |
| 6,661,802 B1 | * | 12/2003 | Homberg et al. .............. | 370/412 |
| 2002/0010771 A1 | * | 1/2002 | Mandato ......................... | 709/223 |
| 2003/0078983 A1 | | 4/2003 | Sullivan et al. | |
| 2003/0115366 A1 | | 6/2003 | Robinson | |

FOREIGN PATENT DOCUMENTS

JP 11-328059 A 11/1999

OTHER PUBLICATIONS

Policy, ACCC Online Disk Space Policy, 2004, pp. 1-3.*
Academic Computing and Communications Center, ACCC Online Disk Space Policy; Jun. 18, 2004.
IBM Corp., Appendix B. WebSphere MQ Integrator SCADA Device Protocol; pp. 205-235; copyright IBM Corp. 2000-2002.

* cited by examiner

*Primary Examiner* — Timothy A Mudrick
(74) *Attorney, Agent, or Firm* — Steven L. Nichols; Van Cott, Bagley, Cornwall & McCarthy P.C.

(57) ABSTRACT

A method of distributing messages from a server system to a plurality of client systems comprises defining a quality of service (QoS) level for messages provided by the messaging system to the client system, defining a message processing capacity provided by a client to the messaging system, and degrading the QoS level of messages in the event that the client system does not provide the defined message processing capacity to the messaging system.

18 Claims, 5 Drawing Sheets

CLIENT RESPONSIBILITIES IN MESSAGING SYSTEMS

BACKGROUND OF THE INVENTION

The present invention relates generally to client/server messaging systems and more, particularly to the responsibilities of clients in such messaging systems.

Asynchronous transfer of messages between application programs running on different data processing systems within a network is well known in the art, and is implemented by a number of commercially available messaging systems. These systems include IBM® WebSphere® MQ family of messaging products, which use asynchronous messaging via queues (IBM and WebSphere are registered trademarks of IBM Corporation within the United States, other countries or both). A sender application program issues a command to send (put) a message to a target queue, and a Websphere MQ queue manager handles the complexities of transferring the message from the sender to the target queue, which may be remotely located across a heterogeneous computer network. The target queue is a local input queue for another application program, which retrieves (gets) the message from this input queue by issuing a command asynchronously from the send operation. The receiver application program then performs it processing on the message, and may generate further messages.

Messaging products such as Websphere MQ provide for assured once and once-only delivery of persistent messages even in the event of system or communications failures. This is achieved by not finally deleting a message from storage on a sender system until it is confirmed as safely stored by a receiver system, and by the use of sophisticated recovery facilities.

Publish/subscribe (pub/sub) data processing systems have become popular in recent years as a way of distributing data messages. Publishers are typically not concerned with the mechanics of the message distribution, and client subscribers are typically not interested in where the messages they receive have come from. Instead, a message broker typically assures the integrity of the message source, and manages the distribution of the message according to the valid subscriptions registered in the broker.

Publishers and clients may also interact with a network of brokers, each one of which propagates subscriptions and forwards publications to other brokers within the network.

One such pub/sub broker is the IBM WebSphere Business Integration Message Broker. In operation the broker connects to a number of publishers each of which publishes messages to the broker on particular topics (e.g. news, weather, sport). Subscribers connected to the broker register their interest in such topics via subscription requests sent to the broker. The subscribers may be systems that are semi-permanently connected to the broker (e.g. via the Internet) or may be devices that connect less frequently to retrieve messages. Examples of the latter type of the device include PDAs (which may connect using IBM WebSphere Everyplace) or mobile phones. For example, one subscriber may request to receive any information published on the weather, whilst another subscriber may desire information on news and sport.

When the broker receives a message on a particular topic from a publisher, the broker determines from its list of subscriptions to whom that message should be sent; and places the message on a queue associated with each listed client subscriber. The messages are kept by the broker until such time as the subscriber connects to the broker. The messages are then transmitted to the subscriber.

The storage provided by the broker for the message queues will have finite capacity and therefore the broker relies on the subscribers to regularly connect to the broker to receive messages. Subscribers that are delinquent in allowing a build up of messages at the broker can cause a degradation in broker performance for well behaved subscribers. It would be desirable to provide a messaging system that addresses the problem of delinquent client systems.

BRIEF SUMMARY OF THE INVENTION

According to one aspect of the present invention, a method of distributing messages from a messaging system to a plurality of client systems comprises defining a quality of service (QoS) level for messages provided by the messaging system to the client system, defining a message processing capacity provided by a client to the messaging system, and degrading the QoS level of messages in the event that one of the client systems does not provide the defined message processing capacity to the messaging system.

According to another aspect of the present invention, a messaging apparatus for distributing messages to a plurality of client systems comprises means for defining a quality of service (QoS) level for messages provided by the messaging system to the client system, means for defining a message processing capacity to be provided by a client system to the messaging system, and means for degrading the QoS level of messages for one of the client systems that does not provide the defined message processing capacity to the messaging system.

According to yet another aspect of the present invention, a computer program product for distributing messages to a plurality of client systems comprises a computer usable medium having computer usable program code embodied therewith. The computer usable program code comprises computer usable program code configured to define a quality of service (QoS) level for messages provided by the messaging system to the client system, computer usable program code configured to define a message processing capacity provided by a client to the messaging system, and computer usable program code configured to degrade the QoS level of messages in the event that one of the client systems does not provide the defined message processing capacity to the messaging system.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following an electrical connection having one or more wires, a portable computer diskette, a hard disk, a random access memory (RAM), a read-only memory (ROM), an erasable programmable read-only memory EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instruction may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
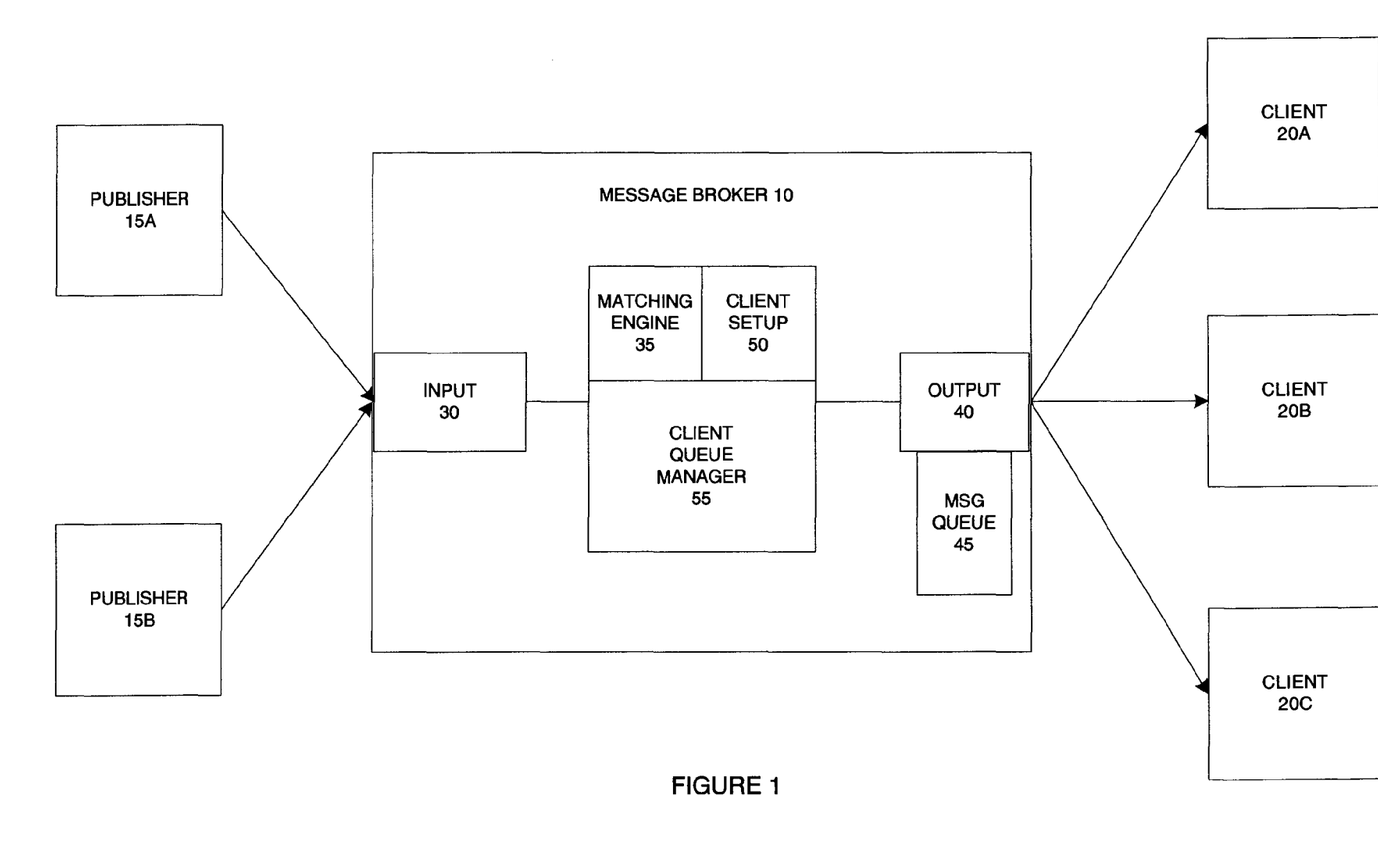
FIG. 1 is a schematic illustration of a pub/sub messaging system including a message broker and client subscribers.

A publish/subscribe (pub/sub) messaging system according to one embodiment of the invention will first be described with reference to FIG. 1. A message broker 10 (e.g. IBM WebSphere® Business Integration Message Broker) is connected for communication to publishing systems 15A and 15B which periodically publish messages to the broker on a range of topics (e.g. news, weather, sport). Subscriber clients 20A to 20C register their interest in such topics via subscription requests received at the broker 10. For example, client 20A may request to receive any information published on the weather, whilst subscriber 20B may desire information on news and sport. The client systems may take a number of different forms e.g. PC desktop system that receives the messages into a browser via the Internet, or a mobile system such as a PDA or laptop system that periodically connects via wireless to receive messages from the broker. Broker 10 might be an identifiable process, set of processes or other executing component, or instead might be "hidden" inside other application code. The logical function of the broker will however exist somewhere in the network.

Figure 6:
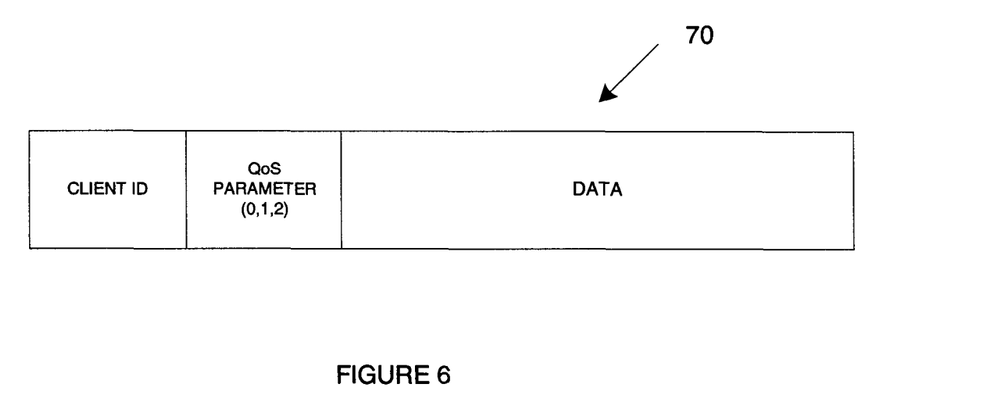
FIG. 6 is a schematic illustration of the format of a message.

A partial illustration of the format of a typical message that is placed onto a client subscriber queue by the message broker is shown in FIG. 6. In addition to the data, the message includes the ID of the target client and also a QoS parameter that defines the QoS associated with the message. For example, a highest level QoS (level 2) defines assured, once-only delivery of the message (important in financial transactions for example). A lower level QoS (level 1) defines assured more-than-once delivery (e.g. the message contains important information but it is not critical that it is delivered only once). A lowest level QoS (level 0) defines a best-efforts only delivery (appropriate for example for non-critical data such as weather, stock market information etc). Defining the QoS level for messages provided by the message broker to a client subscriber may be part of the initial set-up procedure when a client connects to the broker. This is described below. This QoS concept is employed in the WebSphere MQ Telemetry Transport Protocol.

In operation, the broker receives messages from the publishers via input 30. A matching engine 35 matches the topic of the received message against stored client subscriptions and transfers the message to the output 40 where it is placed on output queue 45. The output queue may take the form of a single queue for all clients, that is logically divided to form individual client message queues. When the client is connected to receive messages, the broker then transfers the messages to the client. The broker further includes a client set-up component 50 and a client queue manager component 55, both of which components are implemented as software. The operation of these components will be described in detail below.

The efficiency of operation of the broker depends in part on the availability of the clients to receive messages. For example, the user of a desktop client may be away from the office, or the user of a mobile client may be in an area where wireless connection is not possible. In both cases, the messages for each client will build up on the output message queue, and in extreme cases, the build-up will be such that the space available on the output message queue for new messages may be seriously depleted.

This problem is addressed in the present invention by having a client accept certain commitments in exchange for the pub/sub service provided by the broker. In particular, the broker agrees to provide a maximum queue storage capacity for a client, and the client agrees that if the maximum capacity is exceeded, the broker can downgrade the QoS parameter associated with messages on the client queue and can then delete messages from the queue that have the downgraded QoS level. Thus, in the embodiment to be described in detail below, if the maximum storage capacity is exceeded, a QoS level 1 or level 2 message (which would otherwise be assured of delivery) can be downgraded to a QoS level 0 message and thus become a candidate for deletion.

Figure 2:
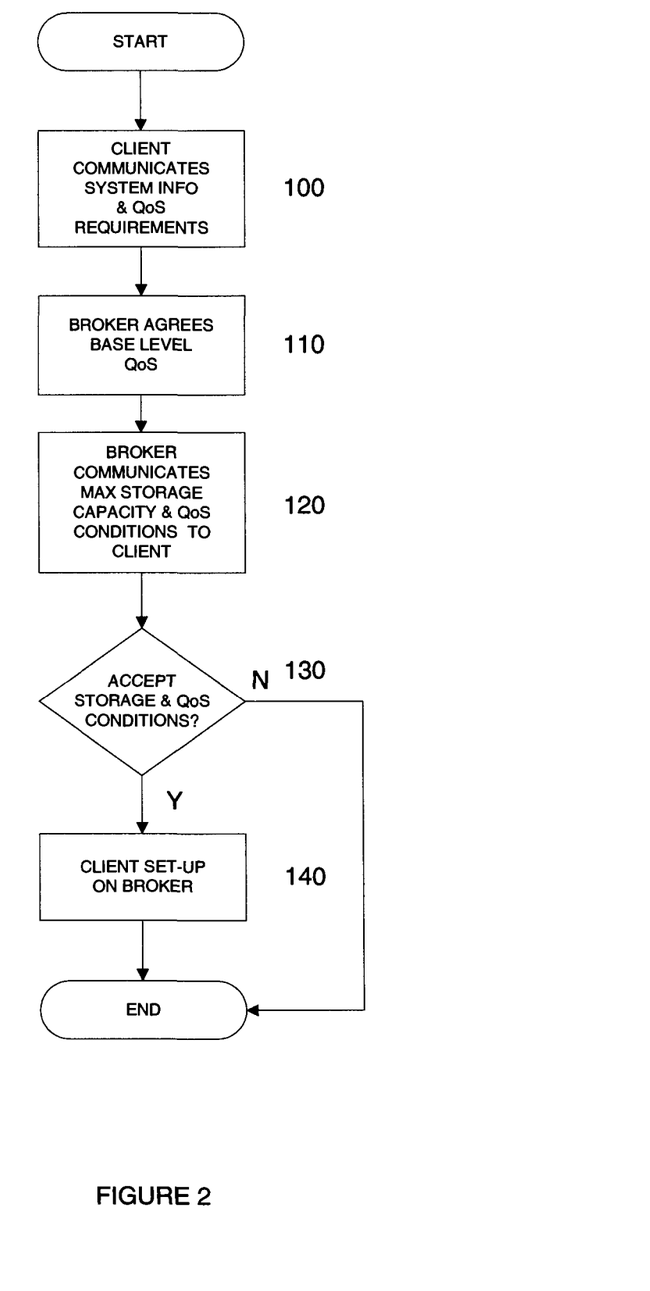
FIG. 2 is a flow chart of the client subscriber set-up process according to one embodiment of the present invention.

FIG. 2 shows the steps involved in the set-up of a client not previously registered with the broker. At step 100 a client connects to the broker (e.g. by means of a browser, via the Internet) and communicates various system information indicative of messaging processing capacity to the broker. This communication may take the form of an explicit message in which the client specifies its availability to retrieve messages from the broker. Alternatively, this information may be implied by the broker from an analysis of one or more of: the type of client system (PC, PDA, mobile phone), the client browser type, connection type (broadband Internet, dial-up). Also at step 100, the client communicates its message QoS requirements to the broker. For example, it may require different levels of QoS in connection with different types of subscriptions. At step 110, the broker agrees that it can provide messages to the client at the requested QoS levels. In the context of the present embodiment this agreed QoS level constitutes a base level which may, in specific circumstances, be altered, as will be described below.

At step 120, the broker defines a maximum amount of storage that will be made available for client messages. This amount may vary between clients. Thus, for a regularly connected desktop PC, the broker will provide a greater amount of storage than for an infrequently connected PDA. This allocation is made on the basis that the PC system is more likely to regularly retrieve messages and is therefore less likely to impact the efficiency of the broker.

Also at step 120, the broker communicates the defined maximum storage capacity to the client along with an indication of how the agreed base level QoS will be downgraded in the event that the client does not process messages at high enough rate to keep the storage below the defined maximum capacity. For example, the broker may specify that exceeding the maximum capacity will result in a downgrading of QoS level 1 messages to QoS level 0. It will be noted that because delivery of QoS level 0 messages is not guaranteed, messages of QoS level 0 are candidates for deletion. In certain circumstances, the broker may specify, that QoS level 2 messages are also be downgraded to level 0.

At step 130 the client decides whether to accept the maximum storage capacity and QoS degradation conditions. If yes, the client transmits an acceptance message to the broker and the client set-up completes on the broker at step 140. If the client decides not to accept the maximum storage capacity and defined QoS degradation conditions (for example if the client believes it can obtain a better service elsewhere), the process ends without completion of the client set-up. Client acceptance may or may not involve direct user interaction.

In other embodiments, there may be situations where the client is willing for the broker to impose a maximum storage capacity and QoS degradation conditions. In this case an explicit offer/acceptance is not needed, and steps 120 and 130 can be omitted. Set-up steps 100 to 140 are repeated for each client on initial connection to the broker.

Figure 3:
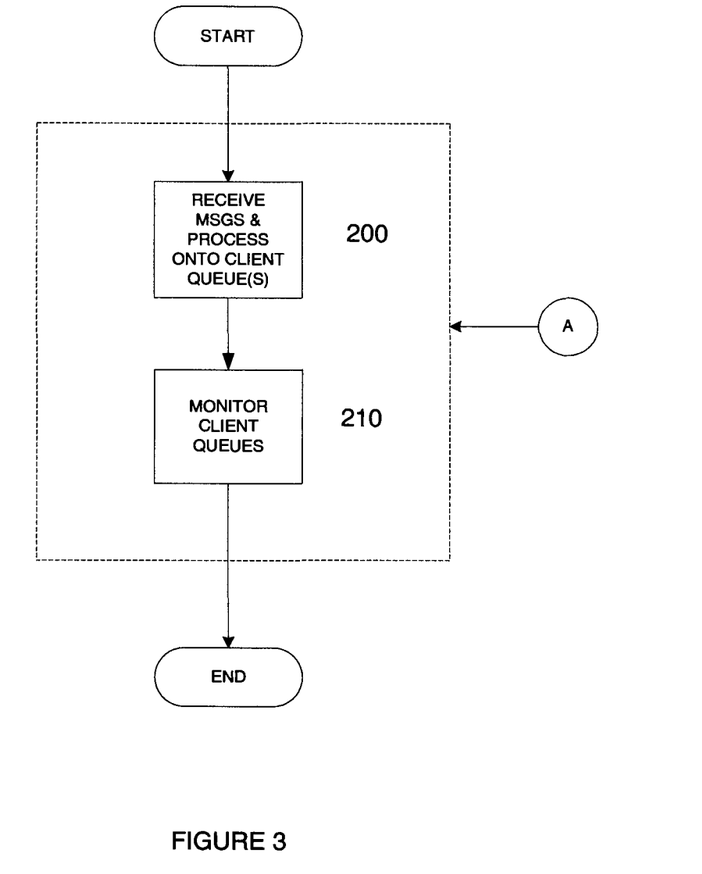
FIG. 3 is a flow chart of the operation of the broker according to one embodiment of the present invention.
Figure 5:
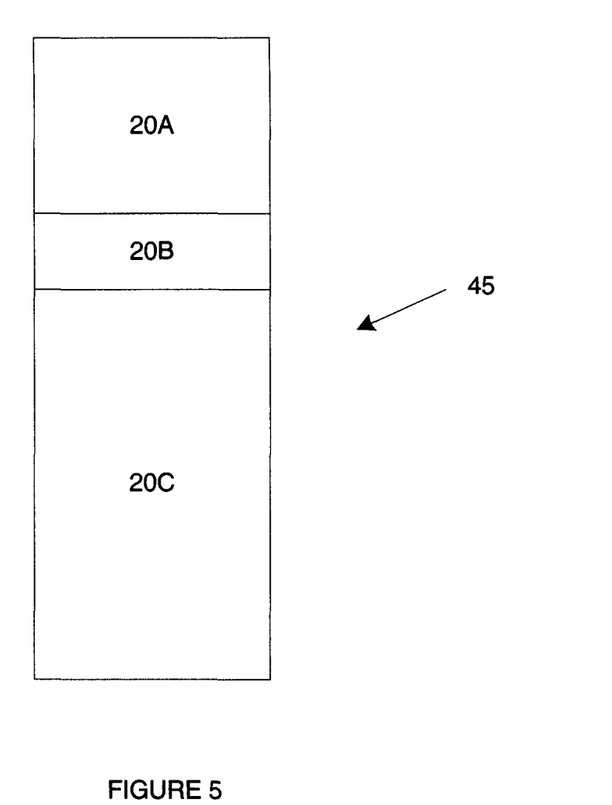
FIG. 5 is a schematic illustration of a broker message queue.

The "steady-state" operation of the broker will next be described with reference to FIG. 3 which shows two independently executing processes 200, 210. In process 200, the broker receives messages from the publishers and using, the matching engine processes the messages onto the appropriate client queue, each message having allocated thereto a base level QoS as previously agreed between the client and the broker. FIG. 5 shows a simplified schematic representation of a broker message queue, logically divided into three client queues for clients 20A, 20B and 20C. The amount of storage for each client queue is defined during client set-up. In the example shown in FIG. 5, client 20A is a laptop system, client 20B is a wirelessly connected PDA, and client 20C is a PC system. The amount of storage allocated for each client in FIG. 5 is indicative of the regularity at which each client will generally access the stored messages. It will be appreciated that in a real-life system, there will be hundreds or thousands of client subscribers registered with the broker with a corresponding number of logical client queues. In process 210, client queue manager 55 monitors the amount of storage occupied by the messages of each client and provides an indication, in a manner described below, when various storage thresholds are reached. Thus, in normal operation, the broker processes messages onto client queues and each client retrieves messages at a rate sufficient to ensure that its allocated storage does not become full.

Figure 4:
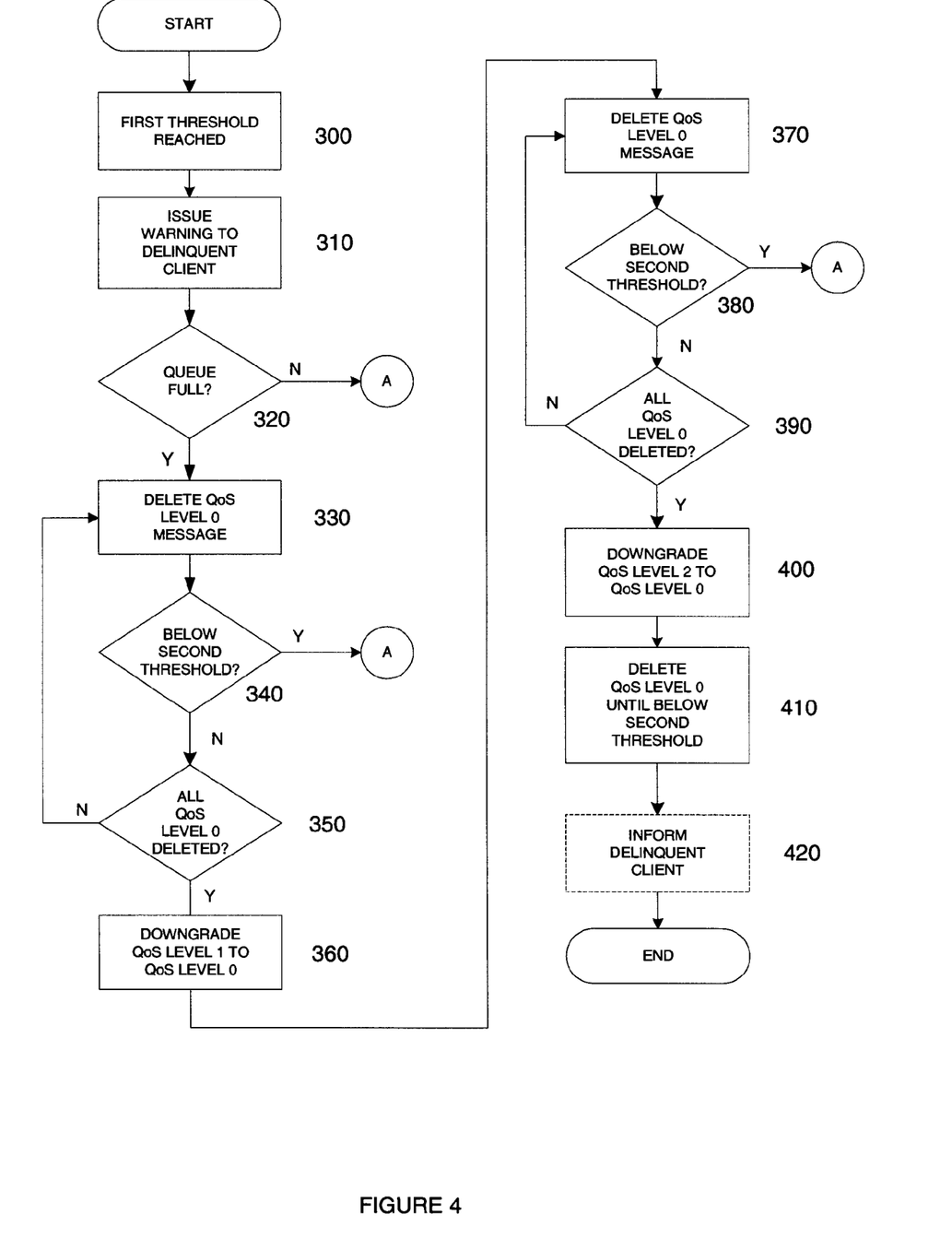
FIG. 4 is a flow chart of the process for managing delinquent clients according to one embodiment of the present invention.

FIG. 4 shows the steps involved in managing a delinquent client, i.e. a client whose defined maximum storage capacity is exceeded. Thus at step 300, if the client queue monitor determines that a first threshold storage value has been reached for a client (e.g. client 20B), it issues a warning to the client at step 310. For a suitably enabled broker and client, this warning may take the form of an SMS or MMS message. The actual value for the first threshold will depend on the specific implementation but may for example represent 90% of the maximum storage capacity allocated to the client in the original set-up process. At step 320, a determination is made as to whether the defined maximum storage capacity is reached. If the client has processed messages from the queue since the warning such that the storage occupied by client messages has gone below a second threshold capacity (for example 70% of the maximum value), the operation of the broker continues per the 'steady-state' process of FIG. 3.

If the maximum capacity has been reached, the broker begins deleting messages from the queue. Therefore at steps 330, 340 and 350, the client queue manager component of the broker begins by deleting those messages on the queue that are already QoS level 0 (messages may be chosen for deletion on a FIFO or other suitable basis) until such time as a second threshold storage value is reached. When the second threshold is reached, the operation of the broker continues per the 'steady-state 1 process of FIG. 3. If at step 350 a determination is made that all QoS level 0 messages have been deleted and the amount of storage occupied by the messages is still greater than the second threshold value, the process proceeds to step 360.

At this point, the broker downgrades the QoS level associated with messages on the client queue in accordance with the QoS degradation conditions agreed during set-up. Therefore, at steps 360, 370 and 380, the client queue manager downgrades QoS level 1 messages to QoS level 0 messages, on a message by message basis, and deletes the downgraded messages until such time as the queue capacity goes below the second threshold value. The QoS level 1 messages may be selected for downgrading on a FIFO or other suitable basis. If at step 380 a determination is made that all the downgraded level 0 messages have been deleted and the amount of storage occupied by the messages is still greater than the second threshold value, the process proceeds to step 400.

At step 400, QoS level 2 messages are downgraded to QoS level 0 and are deleted at step 410 until such time as the capacity goes below the second threshold value. It will be appreciated that in certain cases, the QoS degradation policy agreed at set-up may, specify that only QoS level 1 messages may be downgraded. In such a case, a temporary increase in maximum storage capacity may then be implemented to ensure retention of all QoS level 2 messages until such time as they can be delivered to the client.

Optionally, at step 420 the broker may inform the delinquent client system that messages have been deleted. This notification is effected by means of SMS or MMS messages as appropriate or even by means of notification message placed by the broker at the head of the client message queue.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

That which is claimed is:

1. A method of distributing messages from a broker device in a messaging system implemented by at least one physical processor to a plurality of client systems communicatively coupled to said broker device; the method comprising:

defining a separate quality of service (QoS) level for messages provided by the broker device of the messaging system to each said client system, in which each said client system is a subscriber of the messaging system;

receiving separately in said broker device of the messaging system, from each said client system, a message defining a message processing capacity provided by said client system to the broker device of the messaging system, the message processing capacity defining an availability of the client to retrieve messages from the broker; and degrading, with the broker device of the messaging system, the QoS level of messages transmitted from said broker device to one of the client systems in the event that said broker device determines that said one of the client systems does not provide the message defining the message processing capacity to the messaging system, wherein the message processing capacity is based at least in part on analysis by the broker device of a type of the client system.

2. A method as claimed in claim 1, further comprising conditioning message transmission from said broker device to each said client system on a separately received agreement by each of the client systems that exceeding a maximum message queue storage capacity provided to each of the client systems by the messaging system will result in a downgrading of the message QoS level for a delinquent client system.

3. A method as claimed in claim 2, further comprising, downgrading the QoS level of message on the message queue of the delinquent client system and deleting the downgraded message on a determination that the defined maximum message queue storage capacity is reached.

4. A method as claimed in claim 3, further comprising sending a warning message to the client system prior to deleting messages from the message queue for a delinquent client system.

5. A method as claimed in claim 1, wherein the message QoS levels comprise at least one of assured once-only delivery; assured multiple times delivery; and best-efforts delivery.

6. A method as claimed in claim 1 wherein the broker device of the messaging system comprises a publish/subscribe broker.

7. The method of claim 1, in which the message defining the message processing capacity is an explicit message in which the client system specifies its availability to retrieve messages from the broker device.

8. The method of claim 1, wherein the message processing capacity is further based, at least in part, on analysis by the broker device of a browser type utilized by the client system, and a connection type between the browser device and the client system.

9. The method of claim 1, further comprising sending a notification message to the client system placed by the broker at a head of a message queue that a number of messages have been deleted from the message queue for a delinquent client system.

10. A broker device in a messaging system for distributing messages to a plurality of client systems, the broker device comprising:
a processor and a memory communicatively coupled to said processor, said processor being configured to execute code stored on said memory that causes said processor to:
define a separate quality of service (QoS) level for messages provided by the broker device to each said client system;
receive separately from each said client system a message defining a message processing capacity to be provided by each said client system to the broker device, the message processing capacity defining an availability of each said client system to retrieve messages from the broker;
degrade the QoS level of messages transmitted from the messaging system to one of the client systems responsive to said processor determining that said one of the client systems does not provide the defined message processing capacity to the messaging system;
condition message transmission from said broker device to each said client system on a separately received agreement by the client system that exceeding a maximum message queue storage capacity provided to a message queue of the client system by the messaging system will result in a downgrading of the message QoS level for a delinquent client system;
downgrade the QoS level of a number of messages on the message queue of the delinquent client system and delete the downgraded messages on a determination that the defined maximum message queue storage capacity is reached, and
send at least one notification message to the delinquent client system placed by the broker at a head of the message queue of the delinquent client system that a number of messages have been deleted from the message queue for a delinquent client system.

11. The broker device of claim 10, in which said processor is further configured to send a warning message to the delinquent client system prior to deleting messages from the message queue for the delinquent client system.

12. The broker device of claim 10, wherein the message QoS levels comprise at least one of assured once-only delivery; assured multiple times delivery; and best-efforts delivery.

13. The broker device of claim 10 wherein the broker device of the messaging system comprises a publish/subscribe broker.

14. The broker device of claim 10, in which each said client system is a subscriber of the broker device.

15. A computer program product for distributing messages from a broker device in a messaging system to a plurality of client systems, the computer program product comprising:
a computer usable storage medium having computer usable program code embodied therewith, the computer usable program code comprising, computer usable program code to:
define a separate quality of service (QoS) level for messages provided by the broker device of the messaging system to each said client system;
receive separately from each said client system a message defining a message processing capacity provided by each said client system to the messaging system, the message processing capacity defining an availability of each said client system to retrieve messages from the broker;
degrade the QoS level of messages transmitted from said broker device to one of the client systems in the event that said broker device determines that said one of the client systems does not provide the defined message processing capacity to the messaging system;
condition message transmission from said broker device to each said client system on a separately received agreement by the client system that exceeding a maximum message queue storage capacity provided to a message queue of the client system by the messaging system will result in a downgrading of the message QoS level for a delinquent client system;
downgrade the QoS level of a message on the message queue of the delinquent client system and delete the downgraded message on a determination that the defined maximum message queue storage capacity is reached, and
send at least one notification message to the delinquent client system placed by the broker at a head of the message queue of the delinquent client system that a number of messages have been deleted from the message queue for the delinquent client system.

16. The computer program product of claim 15, further comprising computer usable program code configured to send a warning message to the client system prior to deleting messages from the message queue for a delinquent client system.

17. The computer program product of claim 15, wherein the message QoS levels comprise at least one of assured once-only delivery; assured multiple times delivery; and best-efforts delivery.

18. The computer program product of claim 15, wherein the broker device of the messaging system comprises a publish/subscribe broker.

* * * * *